(12) United States Patent
Anderson

(10) Patent No.: US 6,817,637 B1
(45) Date of Patent: Nov. 16, 2004

(54) SELF-ADJUSTING LOCK ASSEMBLY

(75) Inventor: Victor R. Anderson, Trumbull, CT (US)

(73) Assignee: Loctec Corporation, Newtown, CT (US)

( * ) Notice: Subject to any disclaimer, the term of this patent is extended or adjusted under 35 U.S.C. 154(b) by 0 days.

(21) Appl. No.: 10/692,159

(22) Filed: Oct. 23, 2003

Related U.S. Application Data

(60) Provisional application No. 60/421,625, filed on Oct. 25, 2002.

(51) Int. Cl.[7] .............................................. E05B 15/02
(52) U.S. Cl. ........................ 292/340; 292/150; 292/302; 292/341.15; 292/DIG. 55
(58) Field of Search ............................. 292/57–61, 139, 292/150, 174, 213, 251, 302, 340, 341.15, 341.16, 341.17, DIG. 14, DIG. 55, DIG. 60; 70/159–162, 35–38 C

(56) References Cited

U.S. PATENT DOCUMENTS

| | | | | |
|---|---|---|---|---|
| 1,967,627 A | * | 7/1934 | Riley et al. | 292/341.15 |
| 2,284,180 A | * | 5/1942 | Metcalf | 292/302 |
| 3,002,365 A | * | 10/1961 | Liljequist | 292/302 |
| 3,701,617 A | * | 10/1972 | Crawford et al. | 292/302 |
| 3,918,752 A | * | 11/1975 | Leone et al. | 292/174 |
| 4,597,599 A | * | 7/1986 | Bisbing | 292/174 |
| 4,616,863 A | * | 10/1986 | Bryant | 292/302 |
| 4,796,930 A | * | 1/1989 | Baynes | 292/58 |
| 5,216,906 A | * | 6/1993 | Kurrasch | 292/302 |
| 5,467,619 A | * | 11/1995 | Stillwagon et al. | 292/58 |
| 5,829,280 A | * | 11/1998 | Chen | 70/49 |
| 6,092,846 A | * | 7/2000 | Fuss et al. | 292/302 |
| 6,149,213 A | * | 11/2000 | Sokurenko et al. | 292/340 |

* cited by examiner

*Primary Examiner*—John B. Walsh
*Assistant Examiner*—Christopher Boswell
(74) *Attorney, Agent, or Firm*—Melvin I. Stoltz

(57) ABSTRACT

By providing a lock assembly wherein both components forming the lock assembly are independently adjustable and self-centering, a self-adjusting lock assembly is achieved which assures component engagement and automatic adjustability in all operational directions for all storage boxes, toolboxes, and/or lockboxes. In addition, the present invention also provides a construction which is quickly and easily installed in any desired storage box, toolbar, and/or lockbox while also achieving a cost-effective lock assembly. Furthermore, the present invention employs a lock assembly which enables two or more separate and independent lock assemblies to be interconnected for simultaneous operation, with the opening of one lock assembly controlling the simultaneous opening of the second lock assembly. As a result, large, elongated toolboxes requiring two or more separate and independent lock assemblies can be used with complete operationally control being provided at a single location.

17 Claims, 11 Drawing Sheets

SELF-ADJUSTING LOCK ASSEMBLY

RELATED APPLICATIONS

This application is related to U.S. Provisional Patent Application Ser. No. 60/421,625, filed Oct. 25, 2002 entitled SELF-ADJUSTING LOCK ASSEMBLY.

TECHNICAL FIELD

This invention relates to self-adjusting locks and, in particular, to locks in which the relative positions of the latch assembly and keeper are self-adjusting relative to one another.

BACKGROUND OF THE INVENTION

The use and proliferation of storage boxes, toolboxes, and lockboxes has been continuously increasing for many years. In this regard, a wide variety of alternate sizes, constructions, and configurations have been developed in order to satisfy an ever increasing need and desire for such boxes. One area in which substantial interest has developed for storage boxes, toolboxes, and/or lockboxes is in the construction field, wherein users employ such boxes for a wide variety of equipment and tools needed to practice a particular trade or hobby. Furthermore, in order to assure that the equipment stored in these boxes is secured from vandals and unwanted pilferage, secure, locked engagement of these boxes is a principal requirement.

In attempting to satisfy consumer interest and requirements for the incorporation of locking systems for securing the contents in such boxes, it has been found that the installation of dependable lock assemblies on storage boxes, toolboxes, and lockboxes has been an increasing problem. Typically, manufacturing variances in the construction of the components forming the boxes, as well as the quantity of different products, tools, and equipment which users attempt to store in these boxes causes the cooperating component to be thrown out of alignment with each other. As a result, secure locked engagement is often an unattainable goal.

Most boxes incorporate a pivotal cover which cooperates with a storage base. Due to manufacturing tolerances, the cover and base do not always have the same dimensions to assure secure, mating inter-engagement of these compounds. Typically, there is a certain amount of play and movement between these elements. As a result, special effort has to be expended when installing lock assemblies into such storage boxes, toolboxes, and lockboxes, to assure that the components of the lock assembly are precisely adjusted and aligned in order to provide the required locked interengagement thereof.

Unfortunately, due to thermal expansion of the materials, abuse, and other causes, dimensional changes occur to the lock assemblies as well as the components forming the storage boxes, toolboxes, and/or lockbox, resulting in perfectly aligned lock assemblies becoming misaligned and incapable of achieving the desired mating engagement required. Furthermore, overstuffing the storage boxes with equipment also causes the components forming the lock assemblies to become misaligned, further complicating the desired secure locked retention of the component therein and preventing many prior art systems from providiing locking thereof.

One prior art lock assembly which has attempted to provide self-adjustment is found in U.S. Pat. No. 5,226,302. However, this construction has not satisfied all of the consumer requirements.

Therefore, it is a principal object of the present invention to provide a lock assembly for storage boxes, toolboxes, and lockboxes which is self adjusting, assuring continuous, repeated, secure, locked interengagement under all conditions.

Another object of the present invention is to provide a lock assembly having the characteristic features described above wherein both components forming the lock assembly are independently adjustable for assuring secure, dependable locked engagement under virtually all adverse conditions.

Another object of the present invention is to provide a lock assembly having the characteristic features described above which is quickly and easily installed in any desired storage box, toolbar, and/or lockbox without requiring independent adjustment or alignment.

Another object of the present invention is to provide a lock assembly having the characteristic features described above which is capable of being employed on virtually all lockboxes, storage boxes, and toolboxes, regardless of the construction or configuration of the particular box.

Other and more specific objects will in part be obvious and will in part appear hereinafter.

SUMMARY OF THE INVENTION

By employing the present invention, all of the prior art drawbacks and difficulties have been overcome, and a self-adjusting lock assembly is achieved which provides component engagement and automatic adjustability in all operational directions for all storage boxes, toolboxes, and/or lockboxes. In addition to attaining a lock assembly wherein both components forming the lock assembly are independently adjustable and self-centering, the present invention also provides a construction which is quickly and easily installed in any desired storage box, toolbar, and/or lockbox. As a result, a cost-effective lock assembly is achieved which overcomes all of the prior art drawbacks.

Furthermore, the present invention employs a lock assembly which enables two or more separate and independent lock assemblies to be interconnected for simultaneous operation, with the opening of one lock assembly controlling the simultaneous opening of the second lock assembly. As a result, large, elongated toolboxes requiring two or more separate and independent lock assemblies can be used with complete operationally control being provided at a single location. In this way, a user is able to open an entire, elongated toolbox by unlatching and opening only one side of the toolbox.

In the preferred construction of the present invention, the lock assembly comprises a keeper stud assembly and a latch assembly. In the preferred embodiment, the keeper stud assembly comprises a support base within which a keeper stud is retained in a manner which prevents the keeper stud from moving longitudinally relative to the base, while being able to freely move laterally relative to the support base. In this way, the keeper stud is able to slide laterally in virtually all directions which lie in its plane of movement, thereby establishing a self-centering construction.

In addition, the free end of the keeper stud is preferably beveled and cooperates with a complementary beveled opening formed in the latch assembly. As a result, regardless of dimensional shifts that may occur in these components, the keeper stud enters the latch assembly in a generally self-adjusting, self-aligning construction in order to assure secure engagement and alignment thereof. Furthermore, in the preferred construction, spring means are employed in the latch assembly in order to cause the jaw plates forming the latch assembly to be capable of lockingly engaging the keeper stud in any position or orientation within which the keeper stud enters the jaw plates.

In addition, in its preferred construction, the keeper stud is constructed with a plurality of a radially extending ratchet teeth, axially separated from each other. Furthermore, the ratchet teeth are constructed for enabling a locking edge of the jaw plates of the latch assemblies to be securely engageable and lockingly retained between any two adjacent ratchet teeth. In this way, axial movement of the keeper stud into the latch assembly is easily accommodated, regardless of the ability of the cover of the box to completely close on the base.

Another important feature of the latch assembly of the present invention is the construction of a latch assembly having two cooperating jaw plates, each of which are constructed for longitudinal movement. In the preferred construction, each jaw plate longitudinally moves in substantially identical or parallel planes, with the jaw plates being interconnected for controlled simultaneous movement. Furthermore, the latch assembly is constructed to cause the simultaneous movement of the jaw plates to be in opposite directions.

In addition, each jaw plate incorporates a locking edge which is constructed for peripherally surrounding and lockingly engaging a portion of the keeper stud. Furthermore, when in the fully engaged, locked position, the two locking edges of the two jaw plates substantially surround the entire keeper stud.

By employing this construction, the locking edges of the jaw plates are capable of engaging separate and independent portions of the keeper stud, along the longitudinal length, securely engaging between adjacent ratchet teeth. As a result, due to the cooperating movement and controlled action, self centering, self aligned interengagement is achieved, in a manner which virtually eliminates the need for precise aligned engagement. In addition to providing a self centering self aligned construction, secure locked engagement and enhanced holding strength are also achieved by the present invention.

The invention accordingly comprises the features of construction, combination of elements and arrangement of parts which will be exemplified in the constructions hereinafter described, and the scope of the invention will be indicated in the claims.

THE DRAWINGS

For a fuller understanding of the nature and objects of the present invention, reference should be made to the following the drawings, in which.

DETAILED DESCRIPTION

By referring to FIGS. 1–15, along with the following the detailed discussion, the construction and operation of several alternate embodiments for lock assemblies of the present invention can best be understood. Although this detailed disclosure provides a thorough discussion of the preferred embodiments of the present invention, further alternate constructions for implementing the present invention can be made without deviating from the scope of this invention. Consequently, it is to be understood that the following disclosure is provided for exemplary purposes only, and is not intended as a limitation of the present invention.

Figure 1:
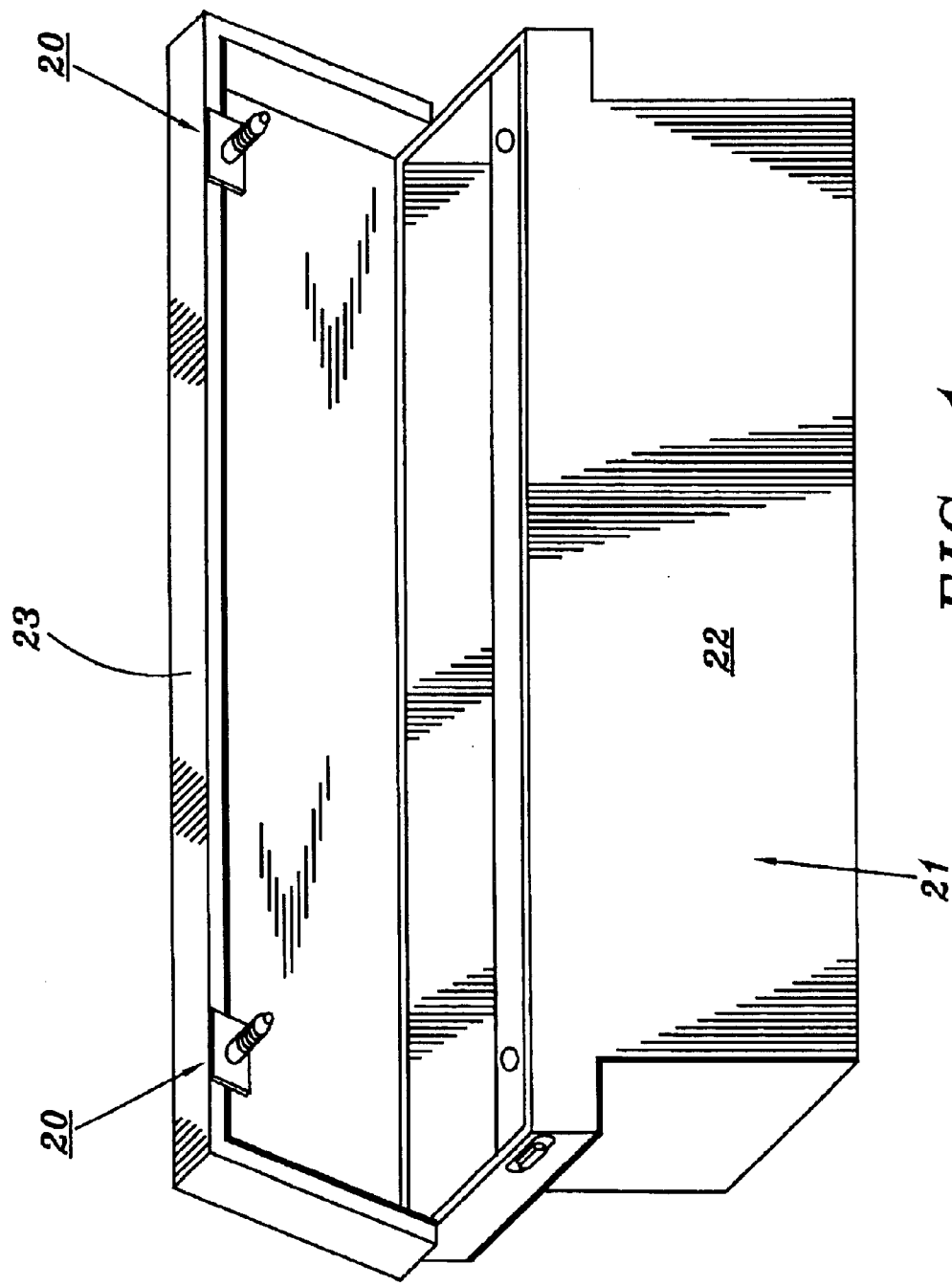
FIG. 1 is a perspective view of a storage box or tool box incorporating the lock system of the present invention.
Figure 2:
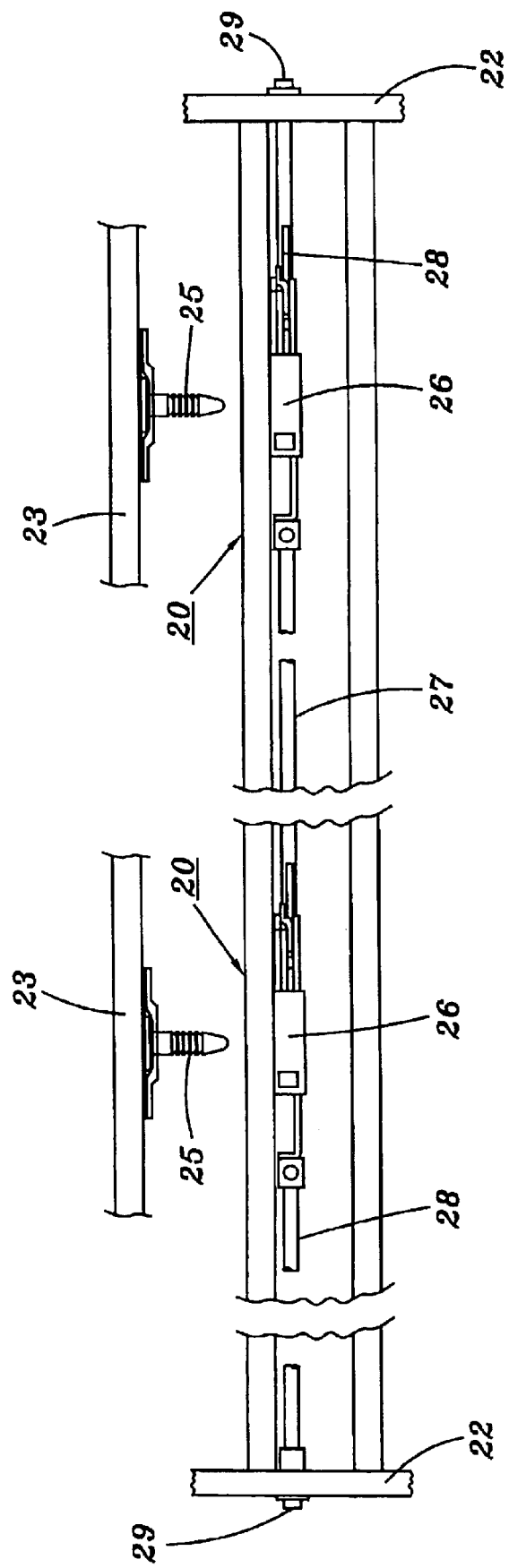
FIG. 2 is a front elevation view of the lock system of the present invention as mounted in a storage box/tool box and incorporating two cooperating lock assemblies.

In FIGS. 1 and 2, lock assembly 20 of the present invention is depicted installed in a typical storage box or lockbox 21, enabling storage box/lockbox 21 to be easily opened and closed, whenever desired. Typical storage boxes/lock boxes 21 comprise a wide variety of the various sizes and shapes, many of which are mounted in the cargo area of trucks or utility vehicles. Typically, boxes 21 incorporate a storage base 22 and a hinged cover 23, which is arcuately pivotable relative to base 22.

As discussed above, one of the principal difficulties encountered with storage box/lockbox 21 is the difficulty in assuring secure locked engagement of cover 23 to base 22. In particular, dimensional changes or alignment variations often occur due to weather and/or use of the box. As result, secure, locked, aligned engagement of the components forming the lock assembly have resulted in difficulties in prior art systems. However, by employing self-adjusting lock assembly 20 of the present invention, all of these prior art difficulties have been eliminated.

In accordance with the present invention, lock assembly 20 comprises floating keeper stud assembly 25 and latch assembly 26. Typically, keeper stud assembly 25 is affixed to one component, such as the hinged top 23, while latch assembly 26 is affixed to a cooperating component, such as base 22. In addition, as shown, large, elongated boxes typically incorporate two lock assemblies 20, since these boxes range between about 50 inches and 65 inches in length.

In a typical installation wherein storage box/lockbox 21 is mounted in a truck, it is important to enable the operator to open box 21 from either side of the truck. Consequently, the two lock assemblies 20 which are mounted in box 21 to provide secure, locked closure of box 21, must be constructed to operate simultaneously from either side of the truck, in order to enable the box to be opened in the desired manner. As a result, as depicted in FIG. 2, latch assemblies 26 of each lock assembly 20 mounted to box 21 are operationally interconnected to each other, in order to enable both latch assemblies 26 to move from a closed position to an open position simultaneously, whenever either side of box 21 is activated.

In order to achieve this result, one of the two jaw plates of the first latch assembly 26 is securely interconnected to one of the two jaw plates of the second latch assembly by employing elongated rod 27. As a result, any lateral movement of one jaw plate causes simultaneous movement of the connected other jaw plate. Furthermore, as detailed below, each latch assembly is biased to return to the locked position, thereby assuring the assembly is always ready to be in locked engagement after being opened.

In addition, the second jaw plate of each latch assembly 26 is securely affixed to elongated rod 28, which extends from latch assembly 26 to the terminating edge of base 22. At this position, lockable release button 29 is mounted to base 22, in cooperating, controlled engagement with rod 28. As result, when appropriately unlocked and activated, release button 29 causes rod 28 to move longitudinally in the desired direction, causing the connected jaw plate of latch assembly 26 to be opened.

As detailed below, the two jaw plates forming latch assembly 26 are controllably interconnected to each other, resulting in the simultaneous movement of the second jaw plate, which in turn causes both jaw plates of the second latch assembly 26 to also move simultaneously into the open position. In this way, the desired opening of storage box/lockbox 21 is achieved in a quick, easy, and efficient manner.

Figure 3:
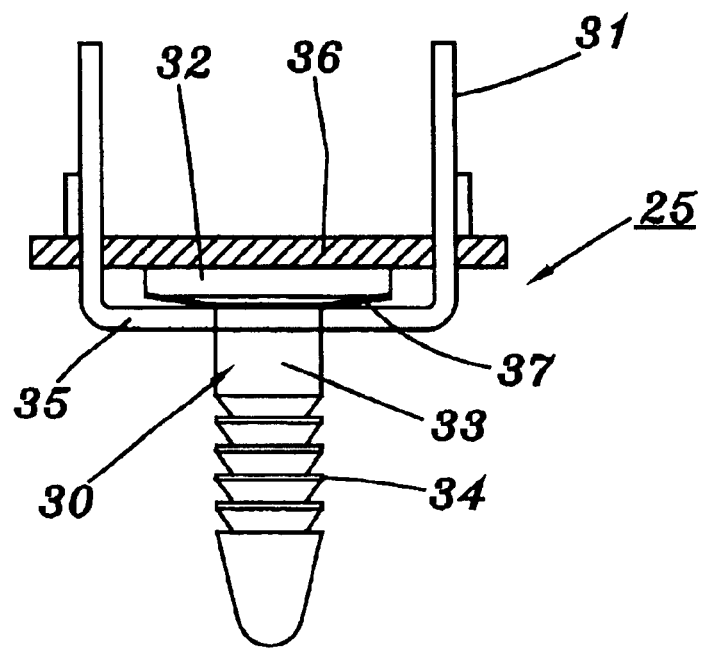
FIG. 3 is a side elevation view, partially in cross-section, of one embodiment of a keeper stud assembly made in accordance with the present invention and forming a part of the lock assembly of the present invention.
Figure 4:
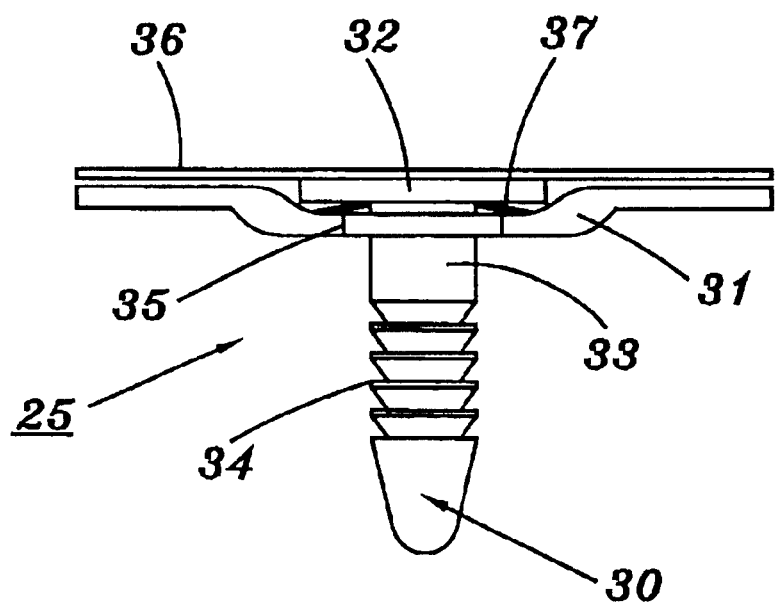
FIG. 4 is a side elevation view of a second embodiment of a keeper stud assembly forming a part of the lock assembly of the present invention.

In FIGS. 3 and 4, two alternate constructions for keeper stud assembly 25 are shown. In these embodiments, keeper stud assembly 25 comprises a round keeper stud 30 and a holding bracket or plate 31. Preferably, keeper stud 30 comprises an enlarged, substantially flat head portion 32 and an elongated tapered cylindrical shaft 33, extending substantially perpendicular from head portion 32 incorporating a plurality of spaced ratchet teeth 34 formed therein. Preferably, ratchet teeth 34 are beveled at their ends and encircle shaft 33.

In the preferred construction, bracket/plate 31 comprises an enlarged hole 35 formed therein, through which shaft 33 of stud 30 extends. As shown, stud 30 is captured by hole 35 of bracket/plate 31 since head portion 32 comprises a diameter greater than the diameter of hole 35.

Furthermore, in order to secure keeper stud in locked engagement with bracket/plate 31, holding plate 36 is affixed to bracket/plate 31 above head 32 of stud 30. As a result, stud 30 is maintained engaged with bracket/plate 31, incapable of vertical movement relative thereto, but freely movable in all directions within hole 35 of bracket 31. In this way, stud 30 is free to float relative to bracket/plate 31 in two orthogonal directions, as well as all other directions lying within the plane thereof.

In order to provide some control over the planar movement of stud 30 in hole 35, metal spring waster 37 is sandwiched between head 32 of stud 30 and bracket/plate 31 about hole 35. With holding plate 36 maintaining spring washer 37 and head 31 in biasing frictional contact, movement of stud 30 in hole 35 is controlled by the resulting frictional forces. Although this construction imparts a resistance to the movement of stud 30 in hole 35, stud 30 is able to freely move with the impact of a sufficient sideward force which causes stud 30 to slide relative to bracket/plate 31 into any alternate position.

By referring to FIGS. 4–14, along with the following detailed discussion, the construction and operation of three alternate embodiments of latch assembly 26 can best be understood. In each of these embodiments, the secure, locking engagement of stud 30 is attained with the locking jaws of each latch assembly peripherally surrounding and securely lockingly engaging rachet teeth 34 formed on shaft 33 of stud 30. In addition, although three alternate embodiments are depicted and described herein, these embodiments are intended as examples of the present invention and not as a limitation thereof.

In the embodiment depicted in FIGS. 3–9, latch assembly 26 comprises first jaw plate 40, second jaw plate 41, housing 42, and pivot bracket 43 as the principal components. In addition, latch assembly 26 also incorporates a plurality of rivets, spacer bearings, and mounting studs to secure the principal components together.

In the preferred construction of this embodiment of the present invention, first jaw plate 40 comprises a substantially flat plate member 45 incorporating enlarged opening 46 formed therein with semi-circular locking edge or jaw portion 47 formed in opening 46. In addition, arm 48 extends from plate member 45.

Second jaw plate 41 comprises substantially flat plate member 50 which incorporates enlarged opening 51 formed therein with semi-circular locking edge or jaw portion 52 formed in opening 51. In addition, jaw plate 41 comprises a first arm 53 extending from plate member 50 in substantially parallel aligned relationship with arm 48 of plate member 45, and second arm member 54 extending from the opposed edge of plate member 50 and comprising an L-shape.

Finally, housing 42 is constructed for peripherally surrounding jaw plates 40 and 41, maintaining jaw plates 40 and 41 in overlying, sliding engagement with each other. In addition, housing 42 incorporates arm 55 extending from one edge thereof in cooperating relationship with arms 48 and 53, and enlarged aperture or hole 56 formed in housing 42 and positioned in cooperating, vertical alignment with openings 46 and 51.

In order to complete the assembly of this embodiment of latch assembly 26, pivot bracket 43 is affixed to arm 55 of housing 42 substantially at its mid point. In addition, one end of pivot bracket 43 is affixed to arm 48 with the opposed end affixed to arm 53.

Once this construction is complete, jaw plates 40 and 41 freely slide in housing 42 in cooperating, controlled relationship to each other. Due to the engagement of pivot bracket 43 with both jaw plates 40 and 41, with the pivot bracket being able to arcuately pivot about its mid point, due to its engagement with arm 55 of housing 42, any sliding movement of jaw plate 40 in one direction causes jaw plate 41 to move in the opposite direction. As a result, by controllably moving L-shaped arm 54, typically by a key activated member or elongated key controlled rod, jaw plates 40 and 41 are controllably moved in a manner which causes semi-circular shaped locking edges/jaws 47 and 52 to be advanced towards each other or away from each other.

Figure 5:
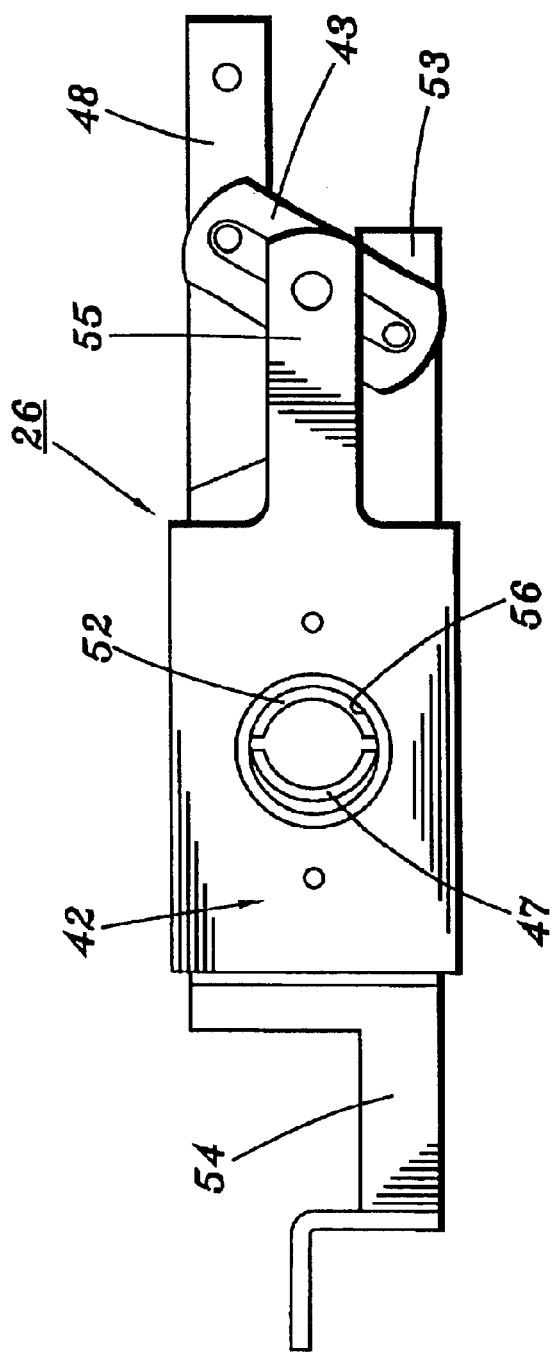
FIG. 5 is a top plan view of one embodiment of a latch assembly made in accordance with the present invention and forming a part of the lock assembly of the present invention, shown in its closed or locking position.
Figure 6:
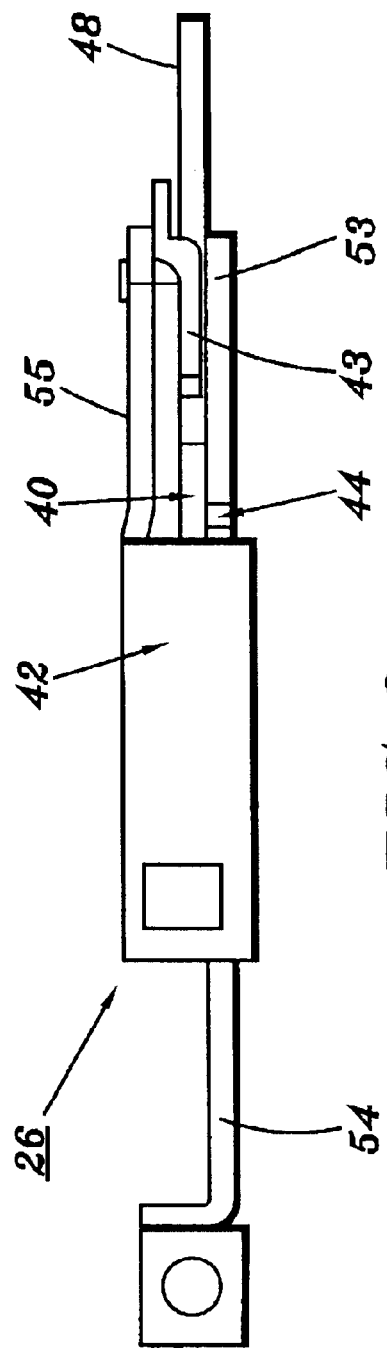
FIG. 6 is a side elevation view of the latch assembly embodiment of FIG. 5.
Figure 7:
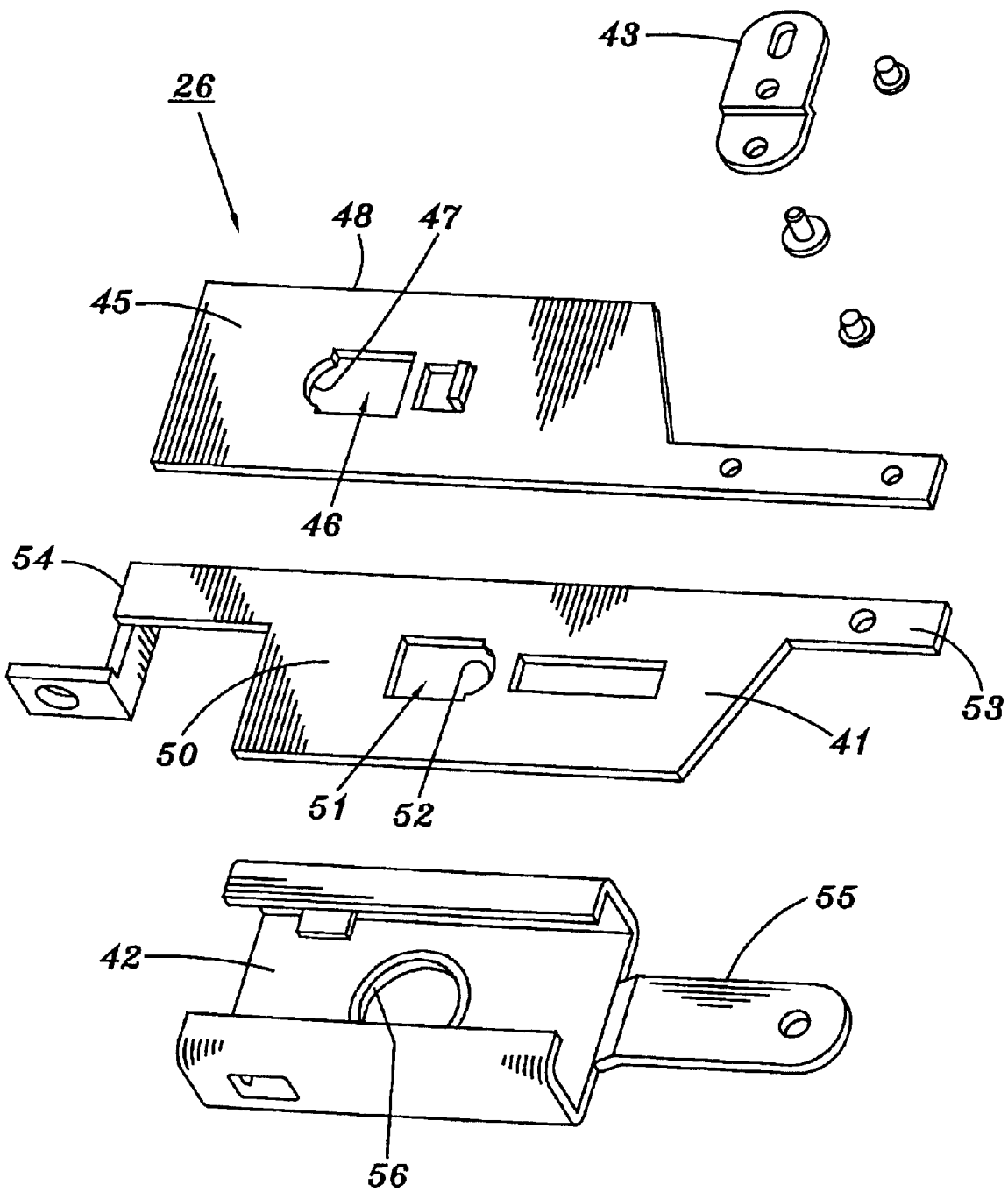
FIG. 7 is an exploded perspective view of the latch assembly of FIG. 5.
Figure 8:
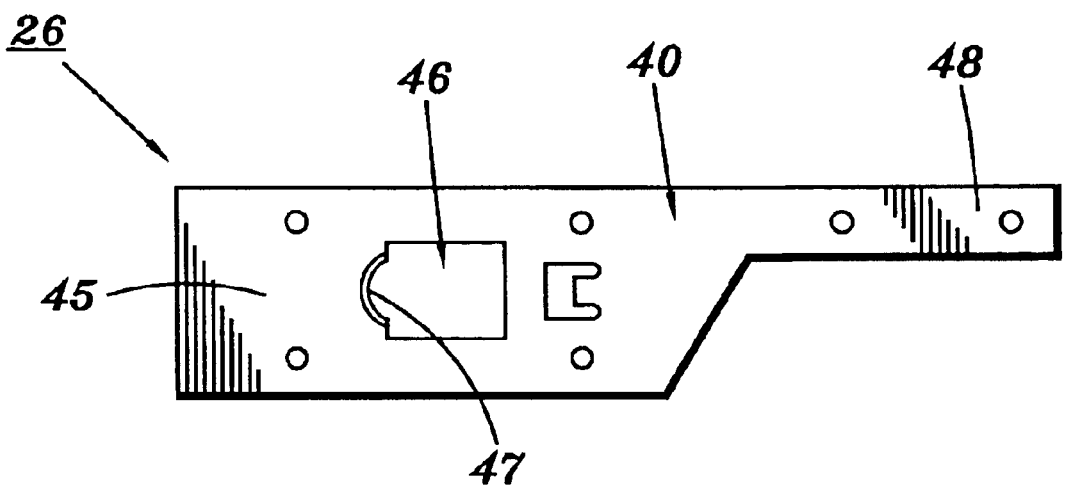
FIG. 8 is a top plan view of the principal components forming the latch assembly embodiment of FIG. 5.

In this way, when stud 30 is placed in position within aligned holes or apertures 46, 51 and 56, secure locking engagement of locking edges/jaws 47 and 52 with ratchet teeth 34 of stud 30 is quickly and easily attained. In addition, once engaged, locking edges/jaws 47 and 52 peripherally surround shaft 33 of stud 30, providing optimum, secure locked engagement therewith. This closed, stud engaging and locking position is shown in FIGS. 5 and 6.

Figure 9:
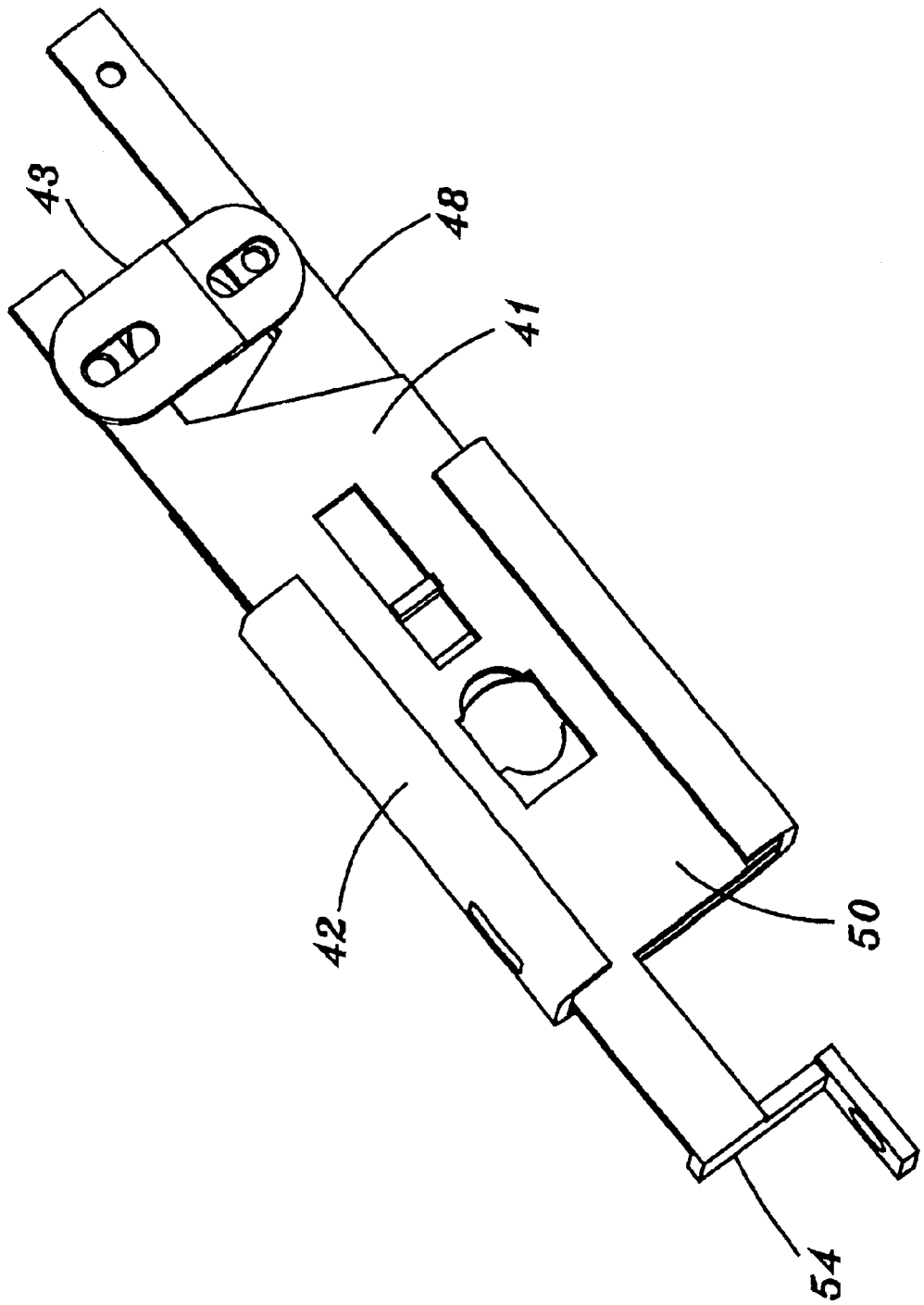
FIG. 9 is a perspective view of the latch assembly of FIG. 5 shown in its open position.

In addition, whenever stud 30 is to be released or unlocked, L-shaped arm 54 is moved in the opposite direction, causing locking edges/jaws 47 and 52 to be moved away from shaft 33 of stud 30. In this way, stud 30 is released and the member to which stud 30 is secured is able to be opened. This released or open position is depicted in FIG. 9.

As discussed above, elongated boxes, such as those ranging between about 50 inches and 65 inches in length, typically incorporate two latch assemblies 26 which are preferably constructed for being locked and unlocked in response to a single key controlled operation. As a result, connecting rods are employed for simultaneously activating the two lock assemblies in response to one key controlled actuation.

In this regard, it has been found that the connecting rods are preferably constructed to cooperate with movement controlling members, as shown in FIG. 2. In this way, substantially simultaneous controlled movement of the each latch assembly is obtained, while also being capable of compensating for any variations that may occur with the positions of the components forming the latch assemblies due to alignment, expansion, and other similar factors. Furthermore, in using the embodiment of latch assembly 26 detailed above, spring means are mounted between jaw plate connecting bar 27 (FIG. 2) and channel or housing 24 within which the latch assemblies 26 are mounted. In this way, the jaw plates of this embodiment are continuously biased into their closed position.

By referring to FIGS. 10–13, along with the following detailed discussion, the construction and operation of a second alternate embodiment of latch assembly 26 can best be understood. In this embodiment, latch assembly 26 is constructed for use in both small and large box constructions, as with the previous embodiment, with the overall construction being adaptable for a virtual universal use, being employable on any desired construction.

As depicted, in this embodiment, the principal components forming latch assembly 26 comprise first jaw plate 60, second jaw plate 61, holding plate 62, guide plate 63, pivot bar 64, and spring means 65. In addition, this embodiment of latch assembly 26 also incorporates a plurality of rivets, bearings, and mounting studs to secure the components together as well as to any supporting member.

In a preferred construction of this embodiment of the present invention, first jaw plate 60 comprises a substantially flat, planer construction incorporating flange 66 extending therefrom with a semi-circular locking edge or jaw portion 67 formed along flange 66. In addition, arm 68 extends from one side of first jaw plate 60, while L-shaped movement control arm 69 extends from the opposed side of first jaw plate 60.

Similarly, second jaw plate 61 comprises a substantially flat, planar construction incorporating flange 70 extending therefrom with a semi-circular locking edge or jaw portion 71 formed along flange 70. In addition, wall 72 extends upwardly from one side of second jaw plate 61 while L-shaped movement control arm 73 extends from the opposed side of second jaw plate 61.

Holding plate 62 is constructed for peripherally surrounding and cooperating with first jaw plate 60 and second jaw plate 61 in combination with guide plate 63. In the preferred construction, holding plate 62 is mounted on one side of first jaw plate 60 and second jaw plate 61, enveloping the bottom surfaces and the side edges thereof, while guide plate 63 is mounted in overlying engagement with the top surfaces thereof. In addition, holding plate 62 incorporates enlarged aperture 74, while guide plate 63 incorporates enlarged aperture 75. In the preferred construction, apertures 74 and 75 are constructed for being aligned with and cooperating with locking edges/jaw 67 and 71, for enabling shaft 33 of keeper stud 30 to be inserted therethrough and lockingly engaged therewith.

In order to assure the secure, cooperating, sliding engagement of first jaw plate 60 with second jaw plate 61, holding plate 62 incorporates arm members 76 and 77 extending from opposite side edges thereof, while guide plate 63 incorporates arm members 78 and 79 extending from opposite side edges thereof. In the preferred construction, these arm members are aligned in pairs for cooperating engagement with each other. Finally, holding plate 62 incorporates wall 80 extending upwardly from one side edges thereof, positioned for cooperating, with wall 72 of second jaw plate 61 for cooperating with spring means 65, as detailed below. Also, guide plate 64 is formed from low friction material, such as nylon, in order to provide ease of movement of jaw members 60 and 61 relative thereto.

Figure 10:
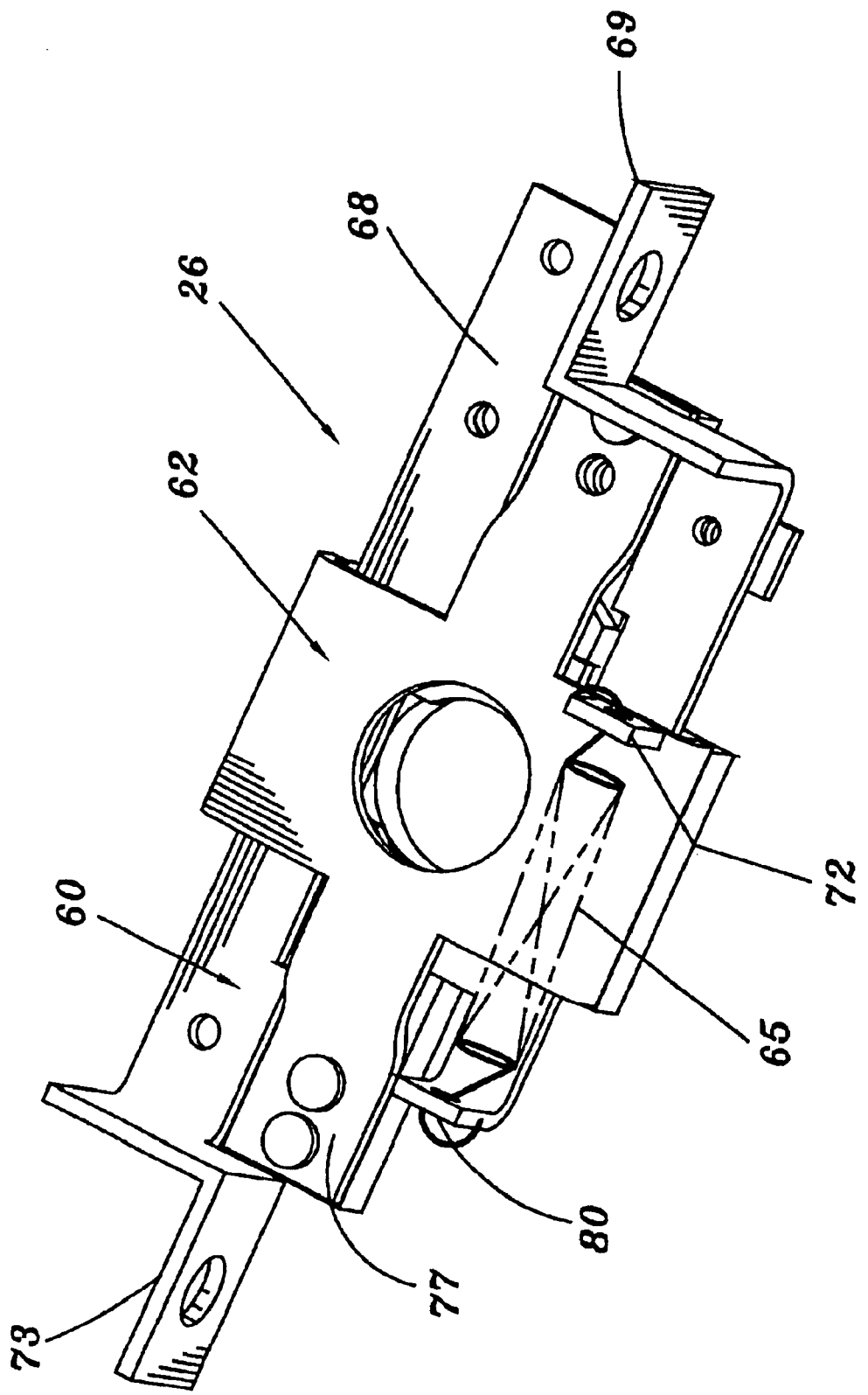
FIG. 10 is a perspective view of a second embodiment of a latch assembly made in accordance with the present invention and forming a part of the lock assembly of the present invention.
Figure 11:
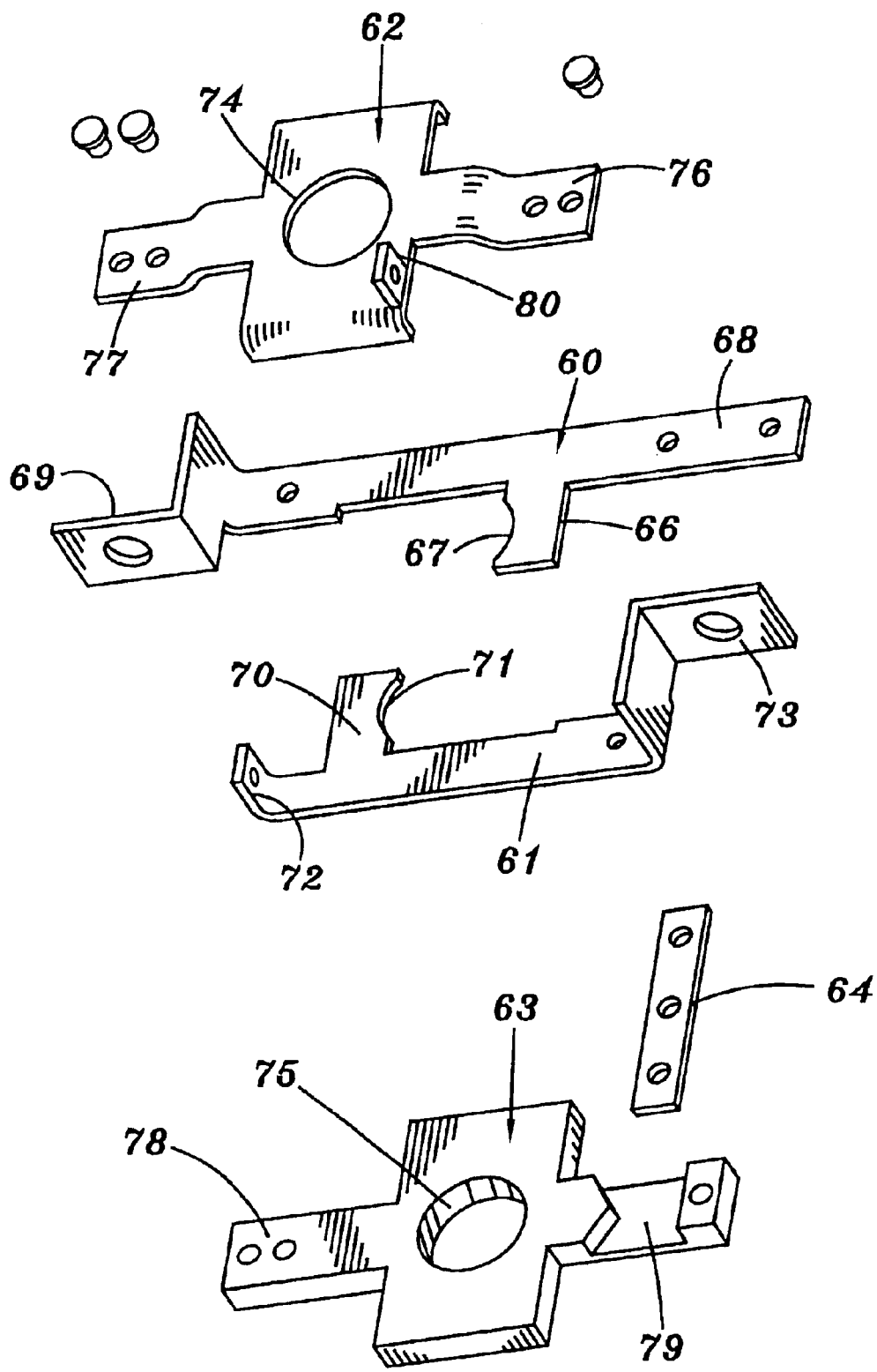
FIG. 11 is an exploded perspective view of the latch assembly of FIG. 10.
Figure 12:
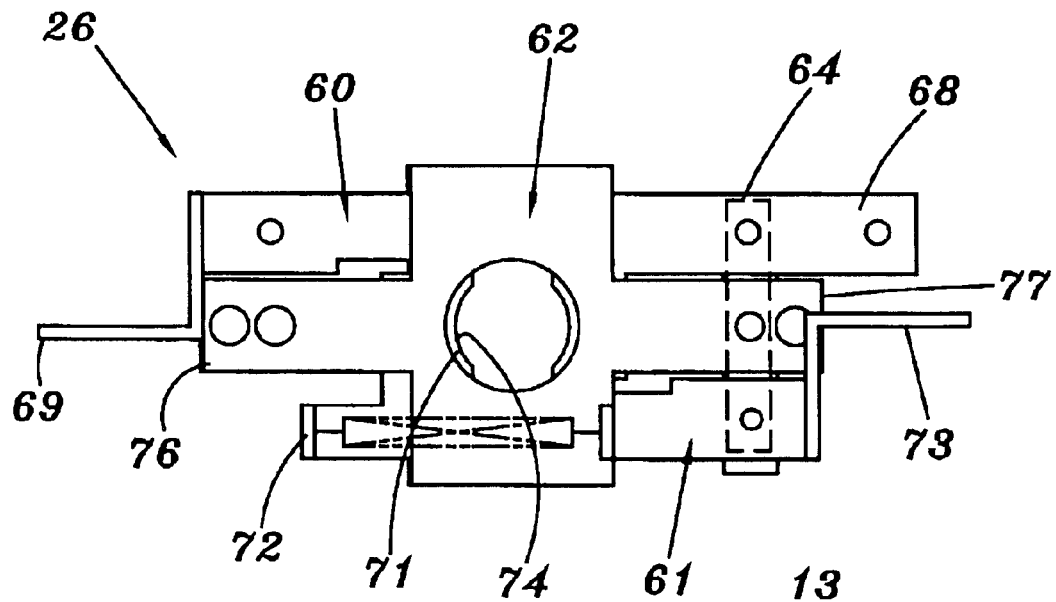
FIG. 12 is a top plan view of the latch assembly of FIG. 10.
Figure 13:
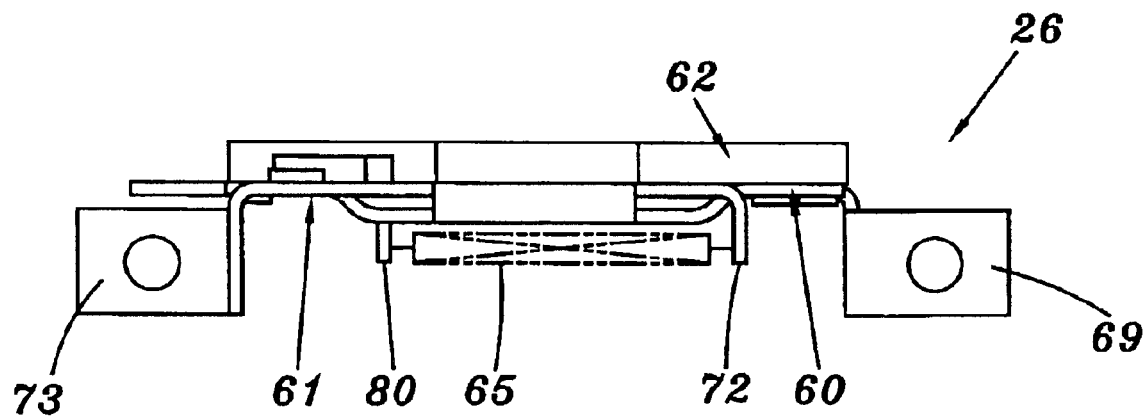
FIG. 13 is a side elevation view of the latch assembly embodiment of FIG. 10.

As fully depicted in FIGS. 10, 12, and 13, this embodiment of latch assembly 26 is assembled by mounting first jaw plate 60 and second jaw plate 61 in cooperating, side to side relationship, with locking edges/jaws 67 and 71 positioned in cooperating relationship with each other to form a generally circular shaped locking zone. In order to securely hold and maintain first jaw plate 60 and second jaw plate 61 in cooperating alignment with each other, holding plate 62 and guide plate 63 are mounted on the opposed top and bottom surfaces thereof, peripherally surrounding and enveloping jaw plates 60 and 61. In this way, first jaw plate 60 and second jaw plate 61 are capable of freely sliding relative to holding plate 62 and guide plate 63 in order to achieve the desired locking and unlocking of stud 30 in the locking zone.

In order to provide the simultaneous, cooperating movement of jaw plates 60 and 61 in response to the movement of only one of said jaw plates, pivot bar 64 is employed. In this construction, pivot bar 64 is mounted substantially at its midpoint to a arm 77 of housing plate 62 in a manner which enables pivot bar 64 to arcuately move relative to arm 77. In addition, one end of pivot bar 64 is mounted to arm 68 of jaw plate 60, while the opposed end of pivot bar 64 is mounted to second jaw plate 61.

With pivot bar 64 being capable of arcuate movement, the actuation of jaw plate 60 in a first direction causes jaw plate 61 to move in the opposed direction. Similarly, the movement of jaw plate 61 in one direction causes jaw plate 60 to move in the opposite direction.

As mentioned above, in this embodiment, spring means 65 is securely mounted to latch assembly 26 by affixing one end of spring means 65 to upstanding wall 80 of housing plate 62 and the opposed end of spring means 65 to upstanding wall 72 of jaw plate 61. In addition, by mounting spring means 65 to walls 72 and 80, with spring means 65 being under tension, jaw plates 60 and 61 are maintained in the closed or locked position. In this position, locking edges/jaws 67 and 71 engage each other to form the generally circular shaped locking zone or configuration.

In order to open or activate this embodiment of latch assembly 26, a sufficient force input is required to overcome the spring biasing forces and move locking edges/jaws 67 and 71 from their normally closed position, shown in FIGS. 12 and 13, to their open position shown in FIG. 10. In addition, once this activation force is removed, latch assembly 26 automatically returns to its closed, or locked position.

In this way, whenever stud 30 is placed in position axially aligned within holes or apertures 74 and 75, secure locking engagement of locking edges/jaws 67 and 71 is attained, with ratchet teeth 34 of stud 30 engaged therein. Once engaged, locking edges/jaws 67 and 71 peripherally surround shaft 33 of stud 30, providing optimum, secure or locked engagement thereof. Furthermore, since spring biasing means 65 is employed, the secure locked engagement of stud 30 is maintained until a controlling force is applied to move locking edges/jaws 67 and 71 into their open position, releasing stud 30 from locked engagement with latch assembly 26.

Figure 15:
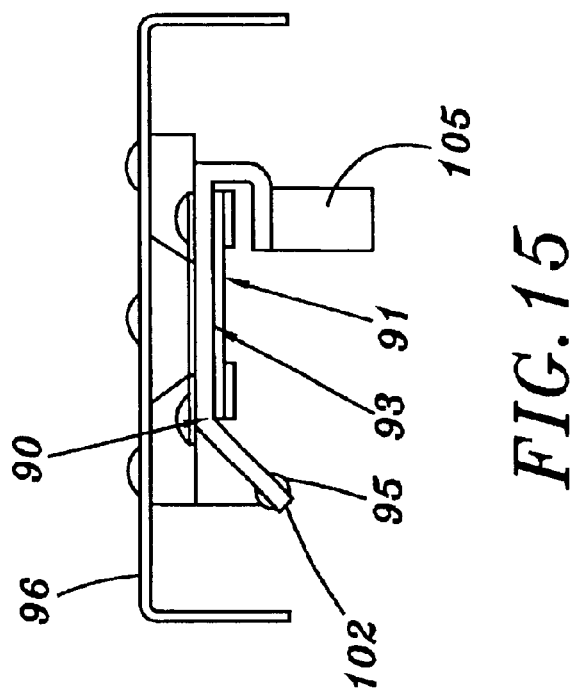
FIG. 15 is a side elevation view of the latch assembly embodiment of FIG. 14.
Figure 14:
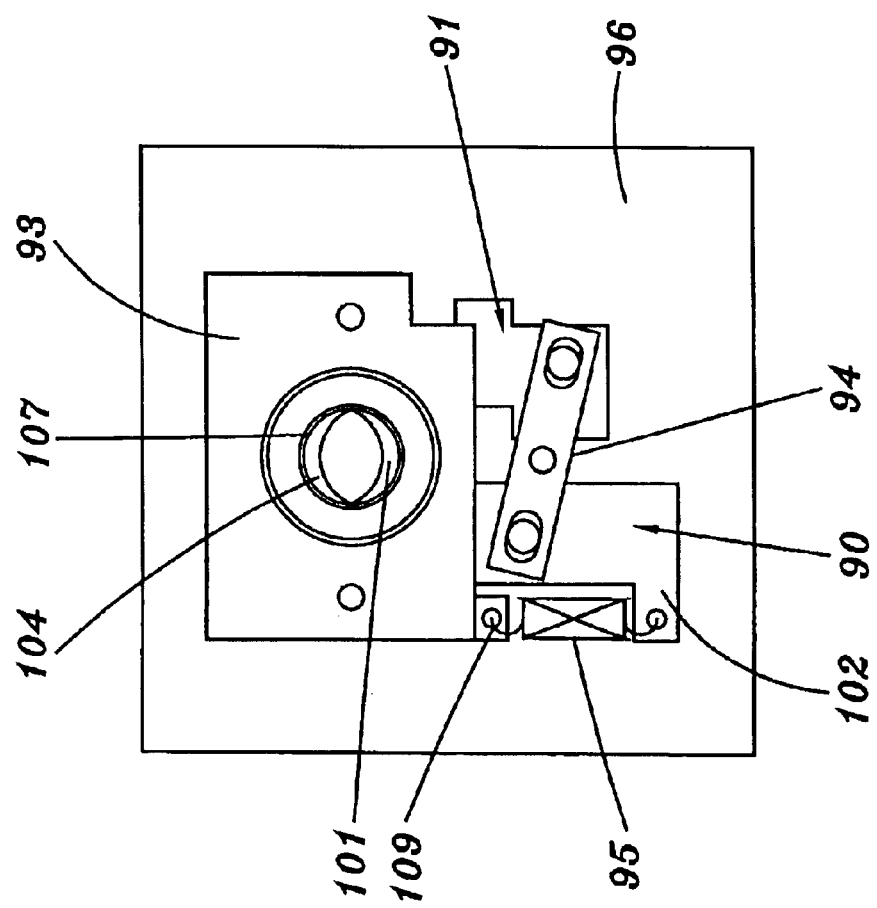
FIG. 14 is a top plan view of a third embodiment of a latch assembly made in accordance with the present invention and forming a part of the lock assembly of the present invention.

By referring to FIGS. 14–15, along with the following detailed discussion, the construction and operation of a third alternate embodiment of latch assembly 26 can best be understood. In this embodiment, latch assembly 26 is typically employed for use with small boxes for functioning as a single, stand-alone latch assembly. However, if desired, this embodiment can be employed on larger box constructions.

As depicted, in this embodiment, the principal components forming latch assembly 26 comprise first jaw plate 90, second jaw plate 91, holding plate 92, guide plate 93, pivot bar 94, and spring means 95. In addition, this embodiment of latch assembly 26 also incorporates a plurality of rivets, bearings, spacers and mounting studs which are employed to secure the components together, as well as to any desired support member. As depicted, mounting plate 96 is employed for maintaining the fully assembled latch assembly 26.

In the preferred construction of this embodiment of the present invention, first jaw plate 90 comprises a substantially flat, elongated, rectangular shaped, planar construction incorporating flange 100 extending therefrom, with a semicircular locking edge or jaw portion 101 formed along flange 100. In addition, wall member 102 extends perpendicularly from one end of the elongated jaw plate 90.

Similarly, second jaw plate 91 comprises a substantially flat, elongated, rectangular shaped, planar construction incorporating flange 103 extending therefrom, with a semicircular locking edge or jaw portion 104 formed along flange 103. In addition, second jaw plate 91 also incorporates an L-shaped lever integrally attached to a side edge of jaw plate 91, positioned for cooperating and interacting with an external movement control member.

Holding plate 92 is constructed for peripherally surrounding and cooperating with jaw plates 90 and 91 in combination with guide plate 93. In the preferred construction, holding plate 92 is mounted on one side of first jaw plate 90 and second jaw plate 91, enveloping the bottom surfaces and side edges thereof, while guide plate 93 is mounted in overlying engagement with the top surfaces thereof. In addition, holding plate 92 incorporates enlarged aperture 106, while guide plate 93 incorporates enlarged aperture 107. In the preferred construction, apertures 106 and 107 are constructed for being aligned with and in cooperating relationship with locking edges/jaws 101 and 104. In this way, shaft 33 of keeper stud 30 is able to be inserted through apertures 106 and 107 and held in locking engagement with edges/jaws 101 and 104.

In order to assure the secure, cooperating, sliding engagement of first jaw plate 90 with second jaw plate 91, holding plate 92 incorporates arm member 108 extending from one side edge thereof. In addition, holding plate 92 incorporates wall 109 extending upwardly from one edge thereof, positioned for cooperating with wall 102 of first jaw plate 90. In this way, spring means 95 is capable of being quickly and easily mounted to walls 102 and 109, for providing the desired biasing forces to latch assembly 26. Finally, guide plate 93 is formed from a low friction material, such as nylon, in order to provide ease of movement of jaw members 90 and 91 relative thereto.

As shown in FIGS. 14 and 15, this embodiment of latch assembly 26 is assembled by mounting first jaw plate 90 and second jaw plate 91 in cooperating, side-to-side relationship, with locking edges/jaws 101 and 104 positioned in cooperating relationship with each other to form a generally circular shaped locking zone. In order to securely hold and maintain first jaw plate 90 and second jaw plate 91 in cooperating alignment with each other, holding plate 92 and guide plate 93 are mounted on the opposed top and bottom surfaces thereof, peripherally surrounding and enveloping jaw plates 90 and 91. In this way, first jaw plate 90 and second jaw plate 91 are capable of freely sliding relative to holding plate 92 and guide plate 93, in order to achieve the desired locking and unlocking of stud 30 in the locking zone formed thereby.

In order to provide the simultaneous, cooperating movement of jaw plate 90 and 91 in response to the movement of only one of said jaw plates, pivot bar 94 is employed. In this construction, pivot bar 94 is mounted substantially at its midpoint to arm 108 of holding plate 92 in a manner which enables pivot bar 94 to arcuately move relative to arm 108. In addition, one end of pivot bar 94 is mounted to jaw plate 90, while the opposed end of pivot bar 94 is mounted to second jaw plate 91.

With pivot bar 94 being capable of arcuate movement, the actuation of jaw plate 91 in a first direction causes jaw plate 90 to move in the opposite direction. In addition, by employing spring means 95, which is affixed under tension, with one end mounted to wall 102 of jaw plate 90 and the second end mounted to wall 109 of holding plate 92, jaw plates 90 and 91 are maintained in the closed or locked position. In this position, locking edges/jaw s 101 and 104 are normally maintained in engagement with each other, forming a generally circular shaped locking zone.

Whenever this embodiment of latch assembly 26 is to be activated or open, a sufficient force input is required to overcome the spring biasing forces of spring means 95. When such a force is applied to L-shaped arm 105, locking edges/jaws 101 and 104 move from their normally closed position to their open position. Once in this position, stud 30 captured or locked therein is released and is capable of being removed. In addition, whenever the activation force is removed, latch assembly 26 automatically returns to its closed or locked position.

It will thus be seen that the object set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not a limiting sense.

It is also to be understood that the following claims are intended to cover all of the generic and specific features of the invention herein described, and all statements of the of the invention which, as a matter of language, might be said to fall therebetween.

Having described our invention, what I claim as new and desire to secure by Letters Patent is:

1. A self-adjusting lock assembly for securely affixing a first movable member to a second fixed member, said lock assembly comprising:
   A. a latching stud assembly comprising
      a. a holding bracket mounted to one of said members and comprising an enlarged aperture formed therein,
      b. a latch-engaging, keeper stud co-operatively engaged with the holding bracket for secure retained engagement therewith and comprising an enlarged head portion and an elongated body portion extending from the head portion, and incorporating a plurality of radially extending teeth formed on the body portion thereof; and
   B. a latch assembly comprising
      a. a first jaw plate incorporating
         1. a stud-engaging jaw portion formed thereon and constructed for co-operative locking engagement with at least a first portion of the teeth formed on the body portion of the keeper stud, and
         2. a movement control arm integrally formed thereon and constructed for enabling longitudinal movement of the first jaw plate in its entirety,
      b. a second jaw plate incorporating
         1. a stud-engaging jaw portion formed thereon and constructed for cooperative locking engagement with at least a second portion of the teeth formed on the body portion of the keeper stud, and
         2. a movement control arm integrally formed thereon and constructed for enabling longitudinal movement of the second jaw plate in its entirety, and
      c. a control member co-operatively engaged with the control arm of the first jaw plate and the control arm of the second jaw plate and constructed for causing simultaneous, longitudinal movement of the first jaw plate and the second jaw plate when activated;
   whereby a lock assembly is achieved which provides a controlled secure affixation of the stud assembly with the latch assembly by peripherally surrounding and engaging the radially extending teeth of the body portion of the keeper stud regardless of position or orientation.

2. The self-adjusting lock assembly defined in claim 1, and further comprising:
   C. a first holding plate cooperatively aligned with the first jaw plate and the second jaw plate and incorporating a support arm integrally attached thereto and co-operatively associated with the control member for enabling the control member to arcuately pivot and controllably move the first jaw plate and second jaw plate in opposite longitudinal directions.

3. The self-adjusting lock assembly defined in claim 2, wherein said control member is further defined as comprising an elongated arm affixed at one end to the movement control arm of the first jaw plate for controlled movement thereof, affixed at its opposed end to the movement control arm of the second jaw plate for controlled motion thereof, and pivotally mounted substantially midway along its length to the support arm of the first holding plate, whereby said control arm is capable of arcuately pivoting substantially about its midpoint for simultaneously controlling the longitudinal movement of the first jaw plate and the second jaw plate in opposite directions.

4. The self-adjusting lock assembly defined in claim 3, wherein the stud engaging jaw portion of the first jaw plate is further defined as comprising an arcuately curved shape, constructed for partially encircling the body portion of the keeper stud and being retainingly engaged between the radially extending teeth thereof and the stud engaging jaw portion of the second jaw plate is further defined as comprising an arcuately curved shape constructed for partially encircling the body portion of the keeper stud and being retainingly engaged between the radially extending teeth thereof, in cooperating relationship with the stud engaging jaw portion of the first jaw plate, whereby the body portion of the keeper stud is substantially encircled by said jaw portions.

5. The self-adjusting lock assembly defined in claim 4, wherein said lock assembly further comprises a second holding plate vertically aligned with the first holding plate and cooperatively associated with the first jaw plate and the second jaw plate for maintaining said jaw plates in sandwiched engagement therebetween and providing cooperative movement and engagement of said keeper stud by said first jaw plate and said second jaw plate.

6. The self-adjusting lock assembly defined in claim 5, wherein said first holding plate and said second holding plate each comprise enlarged apertures formed therein and positioned in coaxial alignment for enabling the elongated body portion of the keeper stud to easily pass therethrough for engagement with the stud engaging jaw portions of the cooperating jaw plates.

7. The self adjusting lock assembly defined in claim 6, wherein said first holding plate and said second holding plate are integrally formed as a housing peripherally surrounding and supportingly retaining the first jaw plate and the second jaw plate.

8. The self adjusting lock assembly defined in claim 4, wherein the first jaw plate and the second jaw plate are further defined as being longitudinally movable between a first stud engaging position wherein the jaw portions of the first and second jaw plates are in peripherally surrounding, locking engagement with the body portion of the keeper stud, and a second position wherein the jaw portion of the first and second jaw plates are disengaged from the body portion of the keeper stud.

9. The self adjusting lock assembly defined in claim 8, wherein said lock assembly further comprises a spring biasing member controllably associated with the first jaw plate for biasing the first jaw plate into its first position, whereby said latch assembly is normally biased in its first, keeper stud engaging position due to the cooperative, simultaneous movement of the first jaw plate and the second jaw plate.

10. The self adjusting lock assembly defined in claim 9, wherein the spring biasing member is further defined as comprising a coil spring having mounting means formed at both opposed ends thereof, with one end of the coil spring being engaged with a portion of the first jaw plate and the opposed end thereof being engaged with a portion of the holding plate.

11. The self adjusting lock assembly defined in claim 4, wherein the keeper stud is further defined as comprising a substantially cylindrically shaped elongated body portion having a diameter which is substantially smaller than the diameter of the aperture formed in the holding bracket, and the head portion comprises a diameter substantially greater than the diameter of the aperture formed in the holding bracket, whereby the keeper stud is capable of lateral movement within the aperture of the holding bracket, while being incapable of longitudinal movement therethrough.

12. The self adjusting lock assembly defined in claim 11, wherein said latch and stud assembly further comprises a holding panel mounted in overlying engagement with the enlarged head of the keeper stud and affixed to the holding bracket for preventing longitudinal, axial movement of the keeper stud relative to the aperture of the holding bracket, while enabling lateral movement of the keeper stud within the aperture.

13. The self adjusting lock assembly defined in claim 12, wherein said holding bracket is further defined as comprising a substantially U-shape formed by two parallel wall members and intermediate central portion affixed to the ends of said wall members and said aperture is formed in the central portion, with the holding panel extending between and affixed to the parallel wall members thereof.

14. The self adjusting lock assembly defined in claim 12, wherein said stud assembly further comprises a spring washer mounted about the body portion of the keeper stud and positioned between the enlarged head portion and the bracket, thereby biasing the enlarged head portion of the keeper stud into engagement with the holding panel, while controlling the lateral movement of the keeper stud relative to the aperture.

15. A self-adjusting lock assembly for securely affixing a first movable member to a second fixed member, said lock assembly comprising:

A. a latching stud assembly comprising
  a. a holding bracket mounted to one of said members and comprising an enlarged aperture formed therein,
  b. a latch-engaging, keeper stud co-operatively engaged with the holding bracket for secure retained engagement therewith and comprising
    1. an enlarged head portion comprising a diameter greater than the diameter of the enlarged aperture of the holding bracket and an elongated body portion extending from the head portion comprising a substantially cylindrical shape having a diameter which is substantially smaller than the diameter of the aperture formed in-the holding bracket, and
    2. incorporating a plurality of radially extending teeth formed on the body portion thereof, whereby the keeper stud is capable of lateral movement within the aperture of the holding bracket, while being incapable of longitudinal movement therethrough; and B. a latch assembly comprising
  a. a first jaw plate incorporating
    1. an arcuately curved stud-engaging jaw portion formed thereon and constructed for partially encircling the body portion of the keeper stud and being retainingly engaged between two adjacent radially extending teeth thereof, and
    2. a movement control arm integrally formed thereon and constructed for enabling longitudinal movement of the first jaw plate in its entirety,
  b. a second jaw plate incorporating
    1. an arcuately curved stud-engaging jaw portion formed thereon and constructed for partially encircling the body portion of the keeper stud and being retainingly engaged between two adjacent radially extending teeth thereof, in cooperating relationship with the stud engaging jaw portion of the first jaw plate, whereby the body portion of the keeper stud is substantially encircled by said jaw portions, and
    2. a movement control arm integrally formed thereon and constructed for enabling longitudinal movement of the second jaw plate in its entirety, C. a first holding plate cooperatively aligned with the first jaw plate and the second jaw plate and incorporating a support arm integrally attached thereto and co-operatively associated with a control member for enabling the control member to arcuately pivot and controllably move the first jaw plate and second jaw plate in opposite longitudinal directions; and D. a control member
  a. co-operatively engaged with the control arm of the first jaw plate and the control arm of the second jaw plate and constructed for causing simultaneous, longitudinal movement of the first jaw plate and the second jaw plate when activated, and
  b. comprising an elongated arm affixed at one end to the movement control arm of the first jaw plate for controlled movement thereof, affixed at its opposed end to the movement control arm of the second jaw plate for controlled motion thereof, and pivotally mounted substantially midway along its length to the support arm of the first holding plate, whereby said control arm is capable of arcuately pivoting substantially about its midpoint for simultaneously controlling the longitudinal movement of the first jaw plate and the second jaw plate in opposite directions;

whereby a lock assembly is achieved which provides a controlled secure affixation of the stud assembly with the latch assembly by peripherally surrounding and engaging the radially extending teeth of the body portion of the keeper stud regardless of position or orientation.

16. A self-adjusting lock assembly for securely affixing a keeper stud with a latch assembly, said latch assembly comprising:

A. a first jaw plate incorporating
  a. an arcuately curved stud-engaging jaw portion formed thereon and constructed for partially encircling the body portion of the keeper stud and being retainingly engaged between two adjacent radially extending teeth thereof, and
  b. a movement control arm integrally formed thereon and constructed for enabling longitudinal movement of the first jaw plate in its entirety, B. a second jaw plate incorporating
  a. an arcuately curved stud-engaging jaw portion formed thereon and constructed for partially encircling the body portion of the keeper stud and being retainingly engaged between two adjacent radially extending teeth thereof, in cooperating relationship with the stud engaging jaw portion of the first jaw plate, whereby the body portion of the keeper stud is substantially encircled by said jaw portions, and
  b. a movement control arm integrally formed thereon and constructed for enabling longitudinal movement of the second jaw plate in its entirety, and C. a control member co-operatively engaged with the control arm of the first jaw plate and the control arm of the second jaw plate and constructed for causing simultaneous, longitudinal movement of the first jaw plate and the second jaw plate when activated.

17. A self-adjusting locking system for securely affixing a storage box/tool box cover to a storage base, said locking system comprising:

A. a first lock assembly comprising:
  a. a first latching stud assembly comprising
    1. a first holding bracket mounted to said cover and comprising an enlarged aperture formed therein, 2. a first latch-engaging, keeper stud co-operatively engaged with the holding bracket for secure retained engagement therewith and comprising an enlarged head portion and an elongated body portion extending from the head portion, and incorporating a plurality of radially extending teeth formed on the body portion thereof; and b. a first latch assembly securely affixed to the storage base and comprising
1. a first jaw plate incorporating
   a. a stud-engaging jaw portion formed thereon and constructed for co-operative locking engagement with at least a first portion of the teeth formed on the body portion of the first keeper stud, and
   b. a first movement control arm integrally formed thereon and constructed for enabling longitudinal movement of the first jaw plate in its entirety,
2. a second jaw plate incorporating
   a. a second stud-engaging jaw portion formed thereon and constructed for cooperative locking engagement with at least a second portion of the teeth formed on the body portion of the first keeper stud, and
   b. a second movement control arm integrally formed thereon and constructed for enabling longitudinal movement of the second jaw plate in its entirety, and
3. a first control member co-operatively engaged with the first control arm of the first jaw plate and the second control arm of the second jaw plate and constructed for causing simultaneous, longitudinal movement of the first jaw plate and the second jaw plate when activated;

B. a second lock assembly comprising:
a. a second latching stud assembly comprising
1. a second holding bracket mounted to one of said members and comprising an enlarged aperture formed therein,
2. a second latch-engaging, keeper stud co-operatively engaged with the holding bracket for secure retained engagement therewith and comprising an enlarged head portion and an elongated body portion extending from the head portion, and incorporating a plurality of radially extending teeth formed on the body portion thereof; and b. a second latch assembly comprising
1. a second jaw plate incorporating
   a. a third stud-engaging jaw portion formed thereon and constructed for co-operative locking engagement with at least a first portion of the teeth formed on the body portion of the second keeper stud, and
   b. a third movement control arm integrally formed thereon and constructed for enabling longitudinal movement of the first jaw plate in its entirety,
2. a fourth jaw plate incorporating
   a. a fourth stud-engaging jaw portion formed thereon and constructed for cooperative locking engagement with at least a second portion of the teeth formed on the body portion of the second keeper stud, and
   b. a fourth movement control arm integrally formed thereon and constructed for enabling longitudinal movement of the second jaw plate in its entirety, and
3. a second control member co-operatively engaged with the third control arm of the second jaw plate and the fourth control arm of the fourth jaw plate and constructed for causing simultaneous, longitudinal movement of the third jaw plate and the fourth jaw plate when activated;

C. an elongated connecting rod securely affixed to one end thereof to the second movement control arm of the second jaw plate of the first latch assembly and securely affixed at its opposed end to a portion of the third jaw plate of the second latch assembly whereby movement of the second jaw plate causes the third jaw plate to move simultaneously therewith resulting in both the first latch assembly and the second latch assembly to open and close simultaneously;

D. a first actuating rod connector at one end to a portion of the first jaw plate of the first latch assembly with the opposed end extending to the edge of the storage box for controlled axial movement by the user; and E. a second activating rod connected at one end to the fourth movement control arm of the fourth jaw plate of the second latch assembly, with the opposed end extending to the edge of the storage box for responsive controlled axial movement by the user;

whereby a locking system is attained which allows both latch assemblies to operate simultaneously in response to user activation at either end of the storage box.

\* \* \* \* \*